United States Patent
Blink

(10) Patent No.: US 6,763,099 B1
(45) Date of Patent: Jul. 13, 2004

(54) ADVANCED THREE WAY CALL DETECTION SYSTEM AND METHOD USING SPREAD SPECTRUM TECHNIQUES

(75) Inventor: Russell Blink, Plano, TX (US)

(73) Assignee: T-Netix, Inc., Carrollton, TX (US)

( * ) Notice: Subject to any disclaimer, the term of this patent is extended or adjusted under 35 U.S.C. 154(b) by 0 days.

(21) Appl. No.: 09/435,013

(22) Filed: Nov. 5, 1999

(51) Int. Cl.⁷ .............................................. H04M 1/00
(52) U.S. Cl. ................................... 379/189; 379/406.01
(58) Field of Search ........................... 379/189, 406.01, 379/406.08

(56) References Cited

U.S. PATENT DOCUMENTS

| | | | |
|---|---|---|---|
| 3,851,121 A | 11/1974 | Marvin | 179/175.2 |
| 4,001,513 A | 1/1977 | Naylor | 179/18 |
| 4,002,848 A | 1/1977 | Stein | 179/18 |
| 4,188,508 A | 2/1980 | Rogers et al. | 179/18 |
| 4,310,726 A | 1/1982 | Asmuth | 179/18 |
| 4,518,825 A | 5/1985 | Brikerhoff et al. | 179/11 |
| 4,559,416 A | 12/1985 | Theis et al. | 179/7.1 |
| 4,602,129 A | 7/1986 | Matthews et al. | 179/18 |
| 4,696,031 A | 9/1987 | Freudberg et al. | 379/386 |
| 4,726,057 A | 2/1988 | Doerry et al. | 379/145 |
| 4,799,255 A | 1/1989 | Billinger et al. | 379/189 |
| 4,815,120 A | 3/1989 | Kosich et al. | 379/34 |
| 4,885,765 A | 12/1989 | Shirakawa | 379/93 |
| 4,896,348 A | 1/1990 | Grantland et al. | 379/145 |
| 4,899,375 A | 2/1990 | Bauer et al. | 379/264 |
| 4,901,341 A | 2/1990 | Carter et al. | 379/67 |
| 4,922,519 A | 5/1990 | Daudelin | 379/67 |
| 4,922,520 A | 5/1990 | Bernard et al. | 379/88 |
| 4,924,488 A | 5/1990 | Kosich | 379/34 |
| 4,933,966 A | 6/1990 | Hird et al. | 379/132 |
| 4,933,967 A | 6/1990 | Lo et al. | 379/207 |
| 4,935,956 A | 6/1990 | Hellwarth et al. | 379/112 |
| 4,937,862 A | 6/1990 | Kosich | 380/3 |
| 4,993,068 A | 2/1991 | Poisenka et al. | 380/23 |
| 5,023,869 A | 6/1991 | Grover et al. | 370/84 |

(List continued on next page.)

FOREIGN PATENT DOCUMENTS

| | | | |
|---|---|---|---|
| JP | 5-30193 | 5/1993 | 379/249 |

OTHER PUBLICATIONS

Bahl, L. "A Maximum Likelihood Approach to Continuous Speech Recovery," Readings in Speech Recognition Ed. A. Waibel and K. Lee, Morgan Kaufman Publishers, pp 308–319, IEEE 1983.

(List continued on next page.)

*Primary Examiner*—F. W. Isen
*Assistant Examiner*—Jefferey Harold
(74) *Attorney, Agent, or Firm*—Fenwick & West LLP

(57) ABSTRACT

An advanced three way call detection system which measures delay times associated with multiple echoes of a reference signal transmitted over a two way call. A reference signal is initially transmitted over a two way call when a two way connection is first established between a local telephone and a remote telephone. The echo characteristics of the two way connection are measured and recorded in an initial echo profile. The initial echo profile represents the number of and timing of each detected echo of the reference signal after transmission of the reference signal over the two way call when the two way connection is first established. The reference signal is then continuously transmitted at various timing intervals during the telephone conversation and the incoming line is sampled in order to detect echoed versions of the reference signal in order to create subsequent echo profiles. Whether a three way calling event has occurred is determined by virtue of changes in the delay times and number of echoes in each subsequent echo profile when compared with the initial echo profile.

27 Claims, 6 Drawing Sheets

U.S. PATENT DOCUMENTS

| | | | |
|---|---|---|---|
| 5,023,906 A | 6/1991 | Novas | 379/372 |
| 5,033,088 A | 7/1991 | Shipman | 381/43 |
| 5,054,059 A | 10/1991 | Stern et al. | 379/200 |
| 5,063,593 A | 11/1991 | Kwon | 379/386 |
| 5,109,405 A | 4/1992 | Morganstein | 379/89 |
| 5,131,024 A | 7/1992 | Pugh et al. | 379/67 |
| 5,150,357 A | 9/1992 | Hopner et al. | 370/68.1 |
| 5,163,083 A | 11/1992 | Dowden et al. | 379/88 |
| 5,187,740 A | 2/1993 | Swaim et al. | 379/209 |
| 5,200,995 A | 4/1993 | Gaukel et al. | 379/200 |
| 5,222,120 A | 6/1993 | McLeod et al. | 379/88 |
| 5,229,764 A | 7/1993 | Matchett et al. | 340/825.34 |
| 5,276,731 A | 1/1994 | Arbel et al. | 379/88 |
| 5,305,312 A | 4/1994 | Fornet et al. | 370/62 |
| 5,309,505 A | 5/1994 | Szlam et al. | 379/88 |
| 5,311,589 A | 5/1994 | Bennett et al. | 379/386 |
| 5,319,702 A | 6/1994 | Kitchin et al. | 379/189 |
| 5,325,427 A | 6/1994 | Dighe | 379/386 |
| 5,327,489 A | 7/1994 | Anderson et al. | 379/207 |
| 5,329,578 A | 7/1994 | Brennan et al. | 379/67 |
| 5,345,595 A | 9/1994 | Johnson et al. | 455/33.1 |
| 5,351,287 A | 9/1994 | Bhattacharyya et al. | 379/95 |
| 5,355,403 A | 10/1994 | Richardson, Jr. et al. | 379/68 |
| 5,375,161 A | 12/1994 | Fuller et al. | 379/57 |
| 5,442,696 A | 8/1995 | Lindberg et al. | 379/386 |
| 5,452,347 A | 9/1995 | Iglehart et al. | 379/199 |
| 5,465,293 A | 11/1995 | Chiller et al. | 379/188 |
| 5,471,519 A | 11/1995 | Howe et al. | 379/67 |
| 5,483,582 A | 1/1996 | Pugh et al. | 379/144 |
| 5,483,593 A | 1/1996 | Gupta et al. | 379/386 |
| 5,535,261 A | 7/1996 | Brown et al. | 379/88 |
| 5,539,812 A | 7/1996 | Kitchin et al. | 379/189 |
| 5,566,229 A | 10/1996 | Hou et al. | 379/88 |
| 5,583,934 A | 12/1996 | Zhou | 379/399 |
| 5,606,604 A | 2/1997 | Rosenblatt et al. | 379/198 |
| 5,617,471 A | 4/1997 | Rogers et al. | 379/212 |
| 5,627,887 A | 5/1997 | Freedman | 379/144 |
| 5,651,056 A | 7/1997 | Eting et al. | 379/88 |
| 5,722,418 A | 3/1998 | Bro | 128/732 |
| 5,724,404 A | 3/1998 | Garcia et al. | 379/34 |
| 5,745,553 A | 4/1998 | Mirville et al. | 379/67 |
| 5,796,811 A | 8/1998 | McFarlen | 379/189 |
| 5,799,068 A | 8/1998 | Kikinis et al. | 379/93.06 |
| 5,805,685 A | 9/1998 | McFarlen | 379/189 |
| 5,809,125 A | 9/1998 | Gammino | 379/189 |
| 5,859,907 A * | 1/1999 | Kawahara et al. | 379/406.08 |
| 5,883,945 A | 3/1999 | Richardson et al. | 379/189 |
| 5,960,064 A | 9/1999 | Foladare et al. | 379/88.26 |
| 6,052,454 A | 4/2000 | Kek et al. | 379/188 |
| 6,072,860 A | 6/2000 | Kek et al. | 379/88.25 |
| 6,141,406 A * | 10/2000 | Johnson | 379/406.08 |
| 6,188,751 B1 | 2/2001 | Scherer | 379/88.22 |

OTHER PUBLICATIONS

Batten, A. "Personal Communications Service and the Intelligent Network," British Telecommunications Engineering, vol. 9, pp 88–91 Aug. 1990.

Lee, K. "Large–Vocabulary Speaker—Independent Continuous Speech Recognition Using HMM," Carnegie Mellon University Department of Electrical and Computer Engineering, CMU–CS–88–148 Apr. 1988.

System 20, Nov. 1992, Specially designed for correctional facilities, from County Jails to State and Federal Prisons. VAC.

Telematic "ConQuest III Intimate Telephone System" Nov. 1992.

LazerVoice, Digital Recording System Inmate Services, 1997–98 Schlumberger Technologies, Inc./LazerVoice, STIL V0222 LazerVoice User's Manual—Version 2.22.

LazerPhone User Reference Manual.

LazerPhone, Inmate Telephone System, Users Manual, 1998 Schlumberger Technologies, Inc./Global Tel*Link, LazerPhone User's Manual—Version 1.0.

LazerPhone, Powerful Performance Uncompromising Standards, 1998.

LazerPhone Technical Manual, System Overview.

* cited by examiner

ADVANCED THREE WAY CALL DETECTION SYSTEM AND METHOD USING SPREAD SPECTRUM TECHNIQUES

FIELD OF THE INVENTION

This invention relates to the field of telecommunications and telephone systems. More particularly, the present invention relates to a system and method for detecting three way calls using spread spectrum technology.

BACKGROUND OF THE INVENTION

The proliferation of private telephone systems and the increasingly sophisticated services offered by such systems have created a need to monitor various events occurring on the telephone lines of the system. This is particularly true with telephone systems designed to provide users with only limited access to the public switched telephone network (PSTN). For example, prison telephone systems are tightly controlled to prevent inmates from contacting unauthorized parties or using the telephone system for illegal purposes. Prison telephone systems typically include some type of authorization mechanism to prevent inmates from dialing unauthorized numbers directly. However, once connected to an authorized number, the inmate may attempt to be connected to a third party at an unauthorized number using three way calling. These calls can only be prevented if the three way calling event is detected and intercepted.

A three way call is initiated when the non-local or remote party (the party outside the private telephone system) has a telephone equipped with three way calling services. The remote party usually depresses the hook switch on the remote telephone, generating a hook flash signal. This hook flash signal instructs the telephone central office to put the local party (the party within the private telephone system) on hold and provide a dial tone to the non-local party. On receipt of the dial tone, the non-local party dials the number of a third party to be added to the telephone conversation. Once a connection is established between the non-local party and the third party, the non-local party will typically depress the hook switch a second time, generating a second hook flash signal which instructs the telephone central office to complete the connection by bringing the local party back onto the active telephone line. Once the connection is completed, the local party and the third party can communicate through the connection made between the non-local party and the third party.

In order to detect three way calling events, prior art three way call detection systems have typically used one of two different methods. In a first method, some conventional three way call detection systems monitor the local telephone connection for the presence of a hook flash or associated central office signals which typically occur during a three way call. A hook flash signal will normally fall in a frequency band outside the ordinary frequency range of signal frequencies produced by the human voice. Prior art three way call detection systems which use this approach monitor signals on the local telephone line through a frequency filter which is designed to pass audio signals within the range of signal frequencies produced by the human voice. If the system detects signals falling within a frequency band outside the normal range of frequencies produced by the human voice, a three way call event is indicated.

U.S. Pat. No. 5,796,811, entitled "Three Way Call Detection," discloses a system and method for detecting three way calls by monitoriong audio signals for features that distinguish ordinary human voice signals from audio signals produced by events associated with three way call events, such as hook flash clicks followed by an interval of silence.

However, this type of system which uses a frequency filtering method for detecting three way call events which may not be very accurate for a number of reasons. First, the frequency filtering method is designed to detect known frequencies of three way call events. However, the frequencies of hook flash signals or other signals generated by activating central office switches, are often modified by transmission through switches and along loaded lines such that the known frequency characteristics of a hook flash signal are substantially distorted by the time the hook flash signal reaches the three way call detection system. Second, some carriers condition telephone lines to suppress certain undesired signal frequencies. This conditioning tends to suppress the low frequency signal produced by a hook flash click. Finally, prison inmates have learned to mask hook flash clicks by yelling into the telephone receiver. If the inmate can make a sound that is louder than the hook flash click, the detection scheme can be defeated.

In a second method, a three way call detection system may be configured to measure changes in the parameters used by an echo-canceller in order to detect a three way call event. In an echo canceller, a replica of an echo is synthesized using coefficients which are determined by known echo characteristics. The synthesized echo is then used to cancel out the actual echo. If the synthesized echo is equal to the actual echo then the actual echo is essentially filtered out from the signal. However, when the actual echo changes, the synthesized echo will no longer cancel out the actual echo. Accordingly, the synthesized echo needs to be altered. In order to determine a three way calling event, this three way call detection system monitors the set of coefficients used to generate the synthesized echo over the duration of a telephone call. Significant changes in the set of coefficients, beyond a predetermined threshold, are used to signify a three way calling event.

One difficulty in this three way call detection system is the need for accurate detection of the echo or reflection. This system may not be able to accurately detect small echoes beyond the range of the echo canceller's ability. Accordingly, very faint changes in the echo characteristics which may be caused by a third party calling event may not be detected and will have no effect on the set of coefficients used by the echo-canceller. Therefore, such a system may not be able to accurately detect a three way calling event.

Accordingly, there is a need to provide a reliable system and method for indicating the occurrence of three way call events without relying on a hook flash click detection scheme. Moreover, such a system and method should be able to accurately determine a three way calling event by detecting a change in the echo characteristics without relying on an echo-canceller. Finally, the system should be adapted to detect very faint echoes so that the system can more accurately detect any change in the echo characteristics which may be caused by a three way call event in order to properly indicate the occurrence of the three way calling event.

SUMMARY OF THE INVENTION

The present invention is directed to an advanced three way call detection system which measures delay times associated with multiple echoes of a reference signal transmitted over a two way call. A reference signal is initially transmitted over the two way call when the two way connection is first established and the echo characteristics of the two way connection are measured and recorded in an initial echo profile. The initial echo profile represents the number of and timing of each detected echo of the reference signal after transmission over the two way call.

In a preferred embodiment, the present invention continuously transmits the reference signal at various timing intervals during the telephone conversation and samples the incoming line to detect echoed versions of the reference signal in order to create subsequent echo profiles. Whether a three way calling event has occurred is determined by virtue of changes in the delay times and number of echoes in each subsequent echo profile when compared with the initial echo profile.

Because of delays imposed by the switching electronics used in modern telecommunications systems, far more delay is imposed by routing signals through the switches of the public switched telephone network than from actual propagation characteristics associated with transmission lines. Every time a new connection is established, additional routing through switches of the public switched telephone network is necessary, and additional delay times and multiple echoes result. This causes changes in the echo profile which is created each time the reference signal is transmitted over the public switched telephone network and the incoming signal is sampled. A histogram is created showing the echo profile over time and significant changes in the echo profile when compared to the initial echo profile can be used to detect a three way calling event.

In the present invention, different paths can be taken by the signal in each direction since the time delay for each detected echo is measured over the round trip relative from the time of transmission of reference signal. If there are no routing changes made during the conversation, the actual number of echoes detected and the timing delay associated with each detected echo will remain nearly constant. However, if a three way call is attempted, the terminal point from which the signal is reflected will change, since the signal is now also routed to a third party telephone. Accordingly, the number of echoes detected and the actual delay associated with those echoes will increase significantly do to the delay associated with the additional switches required to route the signal to the third party telephone through the public switched telephone network. Accordingly, by monitoring the incoming telephone line in order to detect echoed versions of the reference signal and recording a delay time associated with each detected echo, the system and method of the present invention can reliably detect a three way calling event.

In a preferred embodiment, direct sequencing and spread spectrum technology is used to locally generate a pseudo random noise sequence which appears as a wide band, low spectral density noise-like signal. This pseudo random noise sequence is used as the reference signal and injected into the analog voice signals transmitted over the local telephone line between the a local telephone and a remote telephone when a two way connection is first established. The system and method of the present invention measures and records the actual delay times associated with multiple echoes of the pseudo random noise sequence, wherein the delay times represent the amount of time associate with each echoed version of the pseudo random noise sequence as it propagates through all of the public switched telephone network switches and is reflected from various impedance mismatch points. An initial echo profile is created which shows the number of echoes recorded and the delay times associated with each echo.

In a preferred embodiment, the present invention continues to inject the reference signal into the two phone call over the duration of the conversation. Utilizing spread spectrum auto-correlation techniques, the present invention can accurately detect echoed versions of the reference signal and measuring the time delay associated with each detected echo of the reference signal over the duration of the phone call. Using a spread spectrum receiver/filter having auto-correlation techniques, echoed versions of the reference signal are accurately detected, filtered out from any white noise or distortion on the telephone line and the echo time for each detected echo is measured and recorded in a subsequent echo profile. If a significant change in the number of echoes or the echo delay time associated with each detected echo occurs in the subsequent profile when compared with the initial echo profile, the present invention generates a signal indicating that a three way call event has been detected.

In one embodiment, the present invention is a system including a transmitting module for transmitting a reference signal over a two way telephone connection when the two way connection is first established in order to determine initial echo characteristics of the two way telephone connection. A receiving module detects echoed versions of the reference signal and records each echoed version of the reference signal detected, along with an associated echo delay time, in an initial echo profile. At select intervals throughout the duration of the telephone call, the transmitting module will continuously transmit the reference signal over the telephone connection and the receiving module continues to detect echoed versions of the reference signal. This information is continuously recorded in subsequent echo profiles. The receiving module compares the echoed versions recorded in the echo profile with the echoed versions of the reference signal recorded in the initial echo profile. The system generates a histogram which tracks the number of echoes detected and the point in time where each echo is detected. Significant changes in the histogram indicate a three way calling event has been detected and the system will generate a signal alerting an operator.

In an another embodiment, the present invention is a method for detecting three way calling events by detecting an initial set of echo characteristics for a telephone connection over which the telephone call is made and storing this initial set of echo characteristics in an initial echo profile, continuously measuring the echo characteristics of the telephone connection at various times throughout the duration of the telephone call, and comparing the measured echo characteristics with those stored in the initial echo profile in order to detect a three way calling event.

In an another embodiment, the invention is implemented in a software program stored in a memory. The software program causes a processor to perform the various steps for detecting a three way calling event, wherein the software causes the processor to detect when a two-way call is first established and transmit a reference signal at the start of the telephone call, the processor will then detect echoed versions of the reference signal in order to determine the initial echo characteristics of the two-way connection and record these characteristics in an initial echo profile, the processor will then continue to inject the reference signal over the duration of the call and measure the incoming signals in order to detect recurring echoes. The processor will construct a histogram which shows the continuing echo characteristics of connection. This histogram is compared with the information in the initial echo profile in order to detect whether a three way calling event has occurred.

BRIEF DESCRIPTION OF THE DRAWINGS

The present invention has other advantages and features which will be more readily apparent from the following detailed description of the invention and the appended claims, when taken in conjunction with the accompanying drawings, in which:

DETAILED DESCRIPTION OF THE PREFERRED EMBODIMENTS

The present invention is method or process, an apparatus, and a computer readable software product which is preferably implemented within a local telephone system and is utilized in order to detect a three way call event whenever the local telephone system is in use. The method or process may be implemented through software, firmware and/or hardware having any number of modules which cause a processor to perform the various steps of the process or method.

The present invention detects an off-hook condition once a telephone connection has been completed between the local telephone system and a remote telephone (i.e., once the called party lifts the receiver of the remote telephone). Once the off-hook condition is detected, the present invention transmits an initial reference signal over the two way connection in order to determine the initial characteristics of the two way connection. Preferably, the present invention uses a pseudo-random, PN, noise source to generate a PN noise sequence which is used as the reference signal. Utilizing spread spectrum signal processing, the present invention converts the PN noise sequence into a spread spectrum signal and transmits the spread spectrum signal over the established two way connection. The PN noise sequence is reflected or echoed back at various impedance mismatch points in the network, such as a dual hybrid circuit at the remote telephone. Using auto correlation techniques, the present invention samples incoming signals at the local telephone and is able to accurately detect each echoed version of the PN noise sequence, including a far end echo from the dual hybrid circuit of the remote telephone. The present invention generates an initial echo profile showing each echo detected over a period of time and its associated delay time. This initial echo profile is stored in a memory.

The process is then continually repeated throughout the duration of the telephone call. Each time, the reference signal is generated and transmitted, and the incoming signal line at the local telephone is sampled for echoed versions of the reference signal. Each echo detected, and its associated delay time, is compared with the echoes recorded in the initial echo profile which is stored in memory. Significant changes in the number and timing of detected echoes are used to indicate a three way calling event.

It is understood that the reference signal may be any type of accurately detectable signal; however, in using a PN noise sequence and auto correlation techniques in a preferred embodiment, the system and method of the present invention has a further advantage of high processing gain, a feature which allows a returning echo to be detected in poor signal to noise ratio environments or very low echo environments. Alternatively, the present invention may use an FM "Chirp" signal as the reference signal instead of a pseudo random noise sequence.

Figure 1:
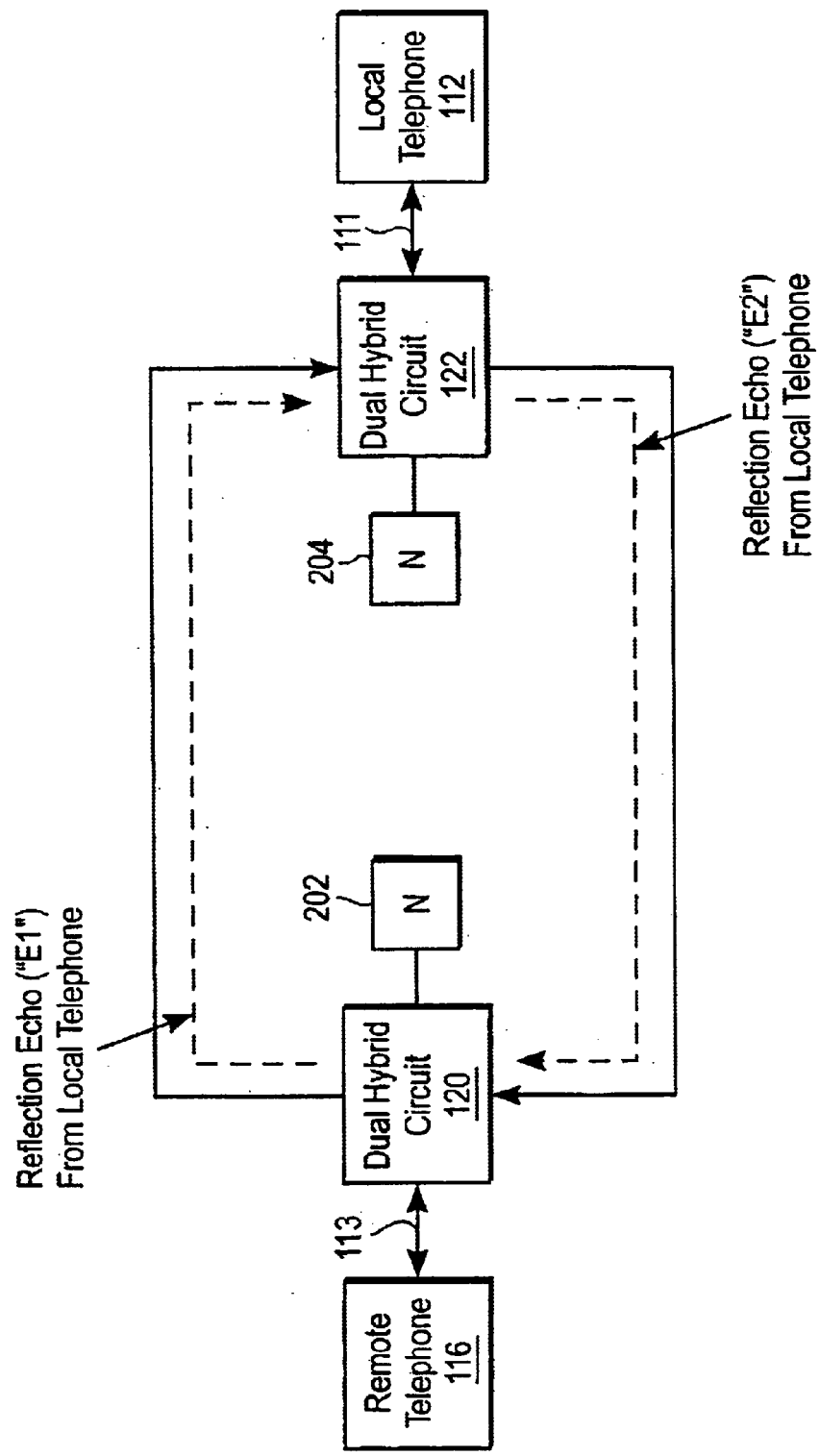
FIG. 1 is a block diagram of a conventional long distance telephone circuit which illustrates the concepts of echoes.

In order to better understand the present invention, a brief introduction to the concept of echoes follows. Referring to FIG. 1, there is shown a block diagram of a conventional long distance telephone circuit for illustrating the concept of echoes. The telephone circuit includes remote and local telephones 116, 112, dual hybrid circuits 120, 122, and balancing networks 202, 204. Generally, the dual hybrid circuits 120 and 122 connect single wire pairs 111 and 113 to two sets of wires, with each set of wire used for transmitting signals in the alternate direction. Accordingly, the telephone audio signals are transmitted from local telephone 112 through dual hybrid circuit 122 and over one set of wires to remote telephone 116; while telephone audio signals are transmitted from remote telephone 116 through dual hybrid circuit 120 and over the other set of wires to local telephone 112.

The balancing networks 202 and 204 are designed to match impedances between the single wire pairs 111 and 113 and the dual hybrid circuits 120,122 such that the circuits will appear to be "invisible" on the line. If the balancing networks 202, 204 are unable to closely match the impedances, then echoes occur on the lines. More specifically, whenever a telephone audio signal encounters an impedance mismatch in the telephone circuit, a portion of that signal is reflected (i.e., returned) as a reflection echo. In FIG. 1, impedance mismatch occurs at dual hybrid circuits 120, 122, thereby giving rise to reflection echoes E1 and E2, respectively.

In FIG. 1, the reflection echo E1 is an echo of the signal orginally transmitted from local telephone 112 to remote telephone 116 and reflection echo E2 is an echo of the signal originally transmitted from remote telephone 116 to local telephone 112. Reflection echoes are best described by further examining the function of dual hybrid circuits 120, 122.

As explained above, dual hybrid circuits 120, 122 are used to couple single wire pairs 111 and 113 to two different dual wire sets in the long-distance telephone circuit. A typical dual hybrid circuit comprises a bridge circuit having three ports. Two of the ports are for receiving and transmitting audio signals, respectively, and the third port is coupled to one of the balancing networks 202 or 204 in order to prevent impedance mismatch between the single wire pair and the two different dual wire sets. If the bridge circuit is not perfectly balanced by the balancing network 202, 204 then the receiving port can be coupled to the transmitting port, thereby giving rise to a reflection echo.

At this point, it is noted that a telephone call that is connected normally (e.g., a two-way call) exhibits a relatively constant set of echo characteristics (e.g., relatively constant impedance matching characteristics). However, if the impedance mismatch points on the line changes, for example, by being put on hold at the central office during a three way call event, a changed set of impedance matching characteristics are exhibited. This change in impedance matching characteristics causes reflection echoes to be generated at different points in the telephone circuit.

Figure 2:
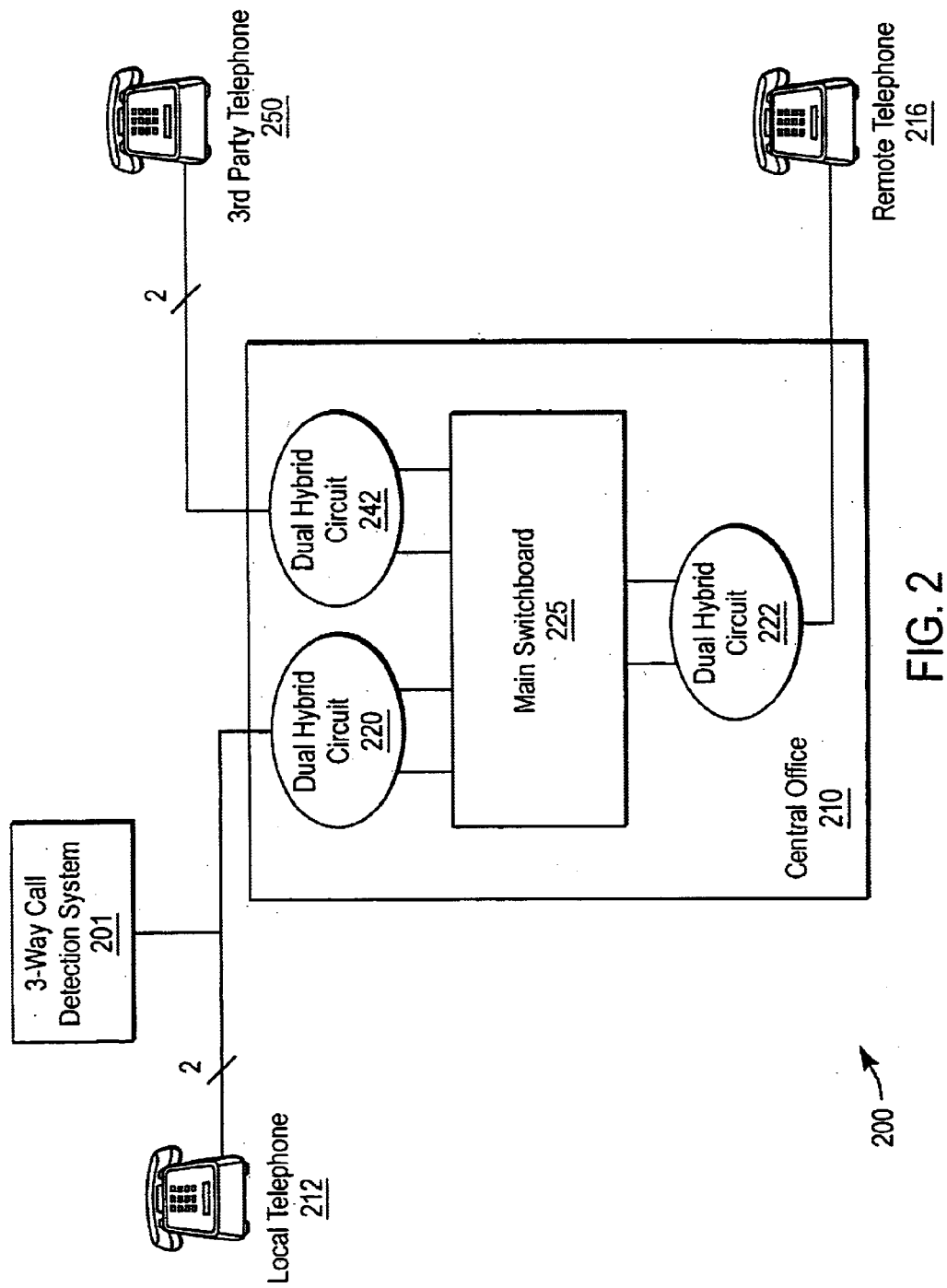
FIG. 2 is a functional block diagram of a telephone system which includes a three way call detection system in accordance with the present invention.

FIG. 2 illustrates a functional block diagram of a telephone system 200 which includes a three way call detection system 201 in accordance with the present invention. Referring to FIG. 2, telephone system 200 comprises a remote telephone 216, a central office 210, a local telephone 212, dual hybrid circuits 220 and 222, and a three way call detection system 201 in accordance with the present invention.

In a preferred embodiment, local telephone 212 is coupled to the central office 210 through dual hybrid circuit 220. The dual hybrid circuit 220 converts a single wire pair from the local telephone 212 into a dual pair of wires. Each wire pair in the dual pair of wires is preferably a copper wire pair used to transmit audio signals in opposite directions—i.e. one copper wire pair in the dual pair of wires is for transmitting signals in a first direction toward the local telephone 212, and the other copper wire pair is used for transmitting signals in a second direction from local telephone 212 to the central office 210.

Dual hybrid circuit 222 is used to couple the remote telephone 216 to the central office 210. Once again, the dual hybrid circuit 222 converts a single wire pair from remote telephone 216 into a dual pair of wires which transmit telephone voice signals in opposite directions through the central office 210, to and from remote telephone 216. Each wire pair in the dual pair of wires is preferably a copper wire pair used to transmit audio signals in the opposite direction—i.e. one copper wire pair in the dual pair of wires is for transmitting signals in a first direction from the remote telephone 216, and the other copper wire pair is used for transmitting signals in a second direction to the remote telephone 216.

During a telephone call made between local telephone 212 and remote telephone 216, telephone voice signals are routed from the local telephone 212 to the remote telephone 216 through the central office 210, and vice versa. It is understood that the central office 210 contains a main switchboard or patch panel 225 for routing the telephone voice signals between local telephone 212 and remote telephone 216. Optionally, the central office 210 may also include multiple amplifiers and filters (not shown) for amplifying and filtering each telephone call as it is routed through the central office 210.

The three way call detection system 201 of the present invention is coupled to the single wire pair at the local telephone 212 end. Preferably, local telephone 212, dual hybrid circuit 220 and the three way call detection system 201 are all implemented as part of a private telephone system.

FIG. 2 further shows a third party telephone 250 coupled to the central office 210 through dual hybrid circuit 242. Dual hybrid circuit 242 converts a single wire pair from third party telephone 250 into a dual pair of wires. Each wire pair in the dual pair of wires transmits signals in the opposite direction—i.e. one wire pair transmits signals in a first direction toward the third party telephone 250 and the other wire pair transmits signals in a second direction from the third party telephone 250. When a three way call is established, signals are routed from the local telephone 212, through the main switchboard 225 in the central office 210, to the third party telephone 250.

In operation, during a telephone call between local telephone 212 and remote telephone 216, the three way call detection system 201 of the present invention first detects an off-hook condition using techniques known in the art—i.e. the invention first detects when the remote telephone 216 is off hook or picked up, thereby indicating a two-way telephone connection has being established between the local telephone 212 and remote telephone 216.

Upon detecting an off hook condition, the three way call detection system 201 of the present invention injects a reference signal into the voice signals being transmitted from the local telephone 212 on the outgoing line in the single wire pair between the local telephone 212 and the dual hybrid circuit 220. Preferably, the reference signal is a pseudo-random noise sequence which has been converted into a wide band, low spectral density spread spectrum signal before it is injected into the voice signals transmitted from local telephone 212. In an alternative embodiment, the present invention may inject an FM "Chirp" signal into the voice signals transmitted from the local telephone 212.

The three way call detection system 201 then samples incoming voice signals being transmitted to the local telephone 212 on the incoming line in the single wire pair between the dual hybrid circuit 220 and the local telephone 212, in order to detect echoed versions of the initial reference signal. In a preferred embodiment, the present invention uses an auto-correlation filtering technique in order to accurately detect each reflected echo of the reference signal where the reference signal is a pseudo-random noise sequence. Alternatively, if the reference signal is an FM "Chirp" signal, a matched FIR filtering technique with an infinite impulse response may be used.

As explained earlier, echoes will occur wherever there is an impedance mismatch in the line, such as at the dual hybrid circuits 220 and 222. An echo or delay time for each detected echo is measured, and the number of echoes and their individual echo or delay times are recorded in an initial echo profile. This initial echo profile establishes the echo characteristics for a normal two way phone connection between local telephone 212 and remote telephone 216.

Accordingly, in a normal two way call between local telephone 212 and remote telephone 216 a number of echoes will occur, including those which occur at dual hybrid circuits 220 and 222, with each echo having an associated echo or delay time which occurs at regular intervals in time. The echo or delay time represents the amount of time required for the reference signal to travel from the three way call detection system 201 to the point where the impedance mismatch occurs (i.e., dual hybrid circuits 220 and 222) and back to the three way call detection system 201.

The present invention accurately detects each echoed version of the reference signal and thereafter generates an initial echo profile which shows each echo detected and the point in time where an echoed version of the reference signal was detected relative to the transmit time when the reference signal was first transmitted. Once the initial echo profile has been generated, these echo characteristics can be continuously compared to subsequent information obtained over the duration of the phone call in order to determine whether a three way calling event has occurred.

Over the duration of the telephone call, the three way call detection system 201 continues to inject the reference signal into the voice signals being transmitted from the local telephone 212. Once again, in a preferred embodiment, the reference signal is a wide band spread spectrum pseudo-random noise sequence. Alternatively, the reference signal may be an FM "Chirp" signal. Preferably, each time the reference signal is injected, the signal is muted from the local telephone 212 so it will not be heard at the local telephone. The reference signal is continuously injected at regular intervals over the duration of the telephone call.

The three way call detection system 201 further continues to sample the incoming voice signals in order to detect incoming echoed versions of the reference signal. Preferably, the reference signal is transmitted in at least four bursts during a single interval. This way multiple echoes can be detected at regular intervals when the incoming voice signals are sampled. Each time, the detected echoed versions of the reference signal are compared with the echoes recorded in the initial echo profile. The initial echo profile shows the number of echoes initially detected and the location in time (i.e.—when) each of the echoed versions were detected when the two way call between the local telephone 212 and the remote telephone 216 was first established. If new echoes are subsequently detected over the duration of the phone call and these new echoes remain consistent—i.e. they appear consistently over the four bursts, then a change in the echo characteristics of the line or connection has been detected thereby signaling the occurrence of a three way calling event.

Figure 3A:
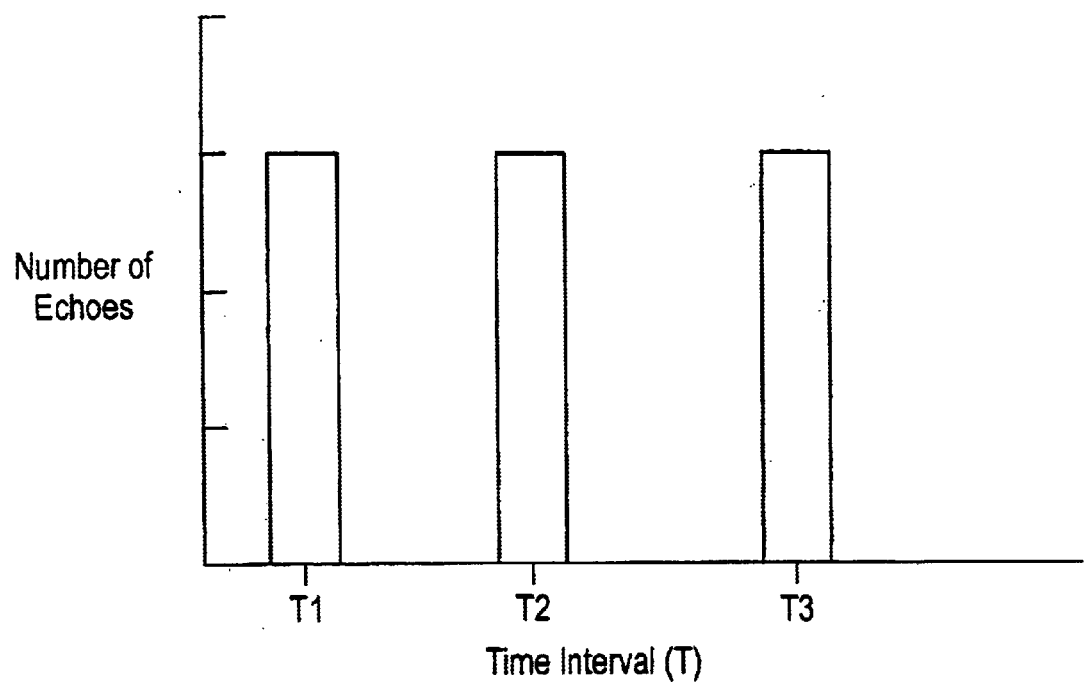
FIGS. 3a and b illustrates a histogram used for determining whether a three way calling event has occurred in accordance with a preferred embodiment of the present invention.

A histogram is preferably used in order to compare each echo detected with the echoes recorded in the initial echo profile. FIG. 3a illustrates a sample histogram which is used in accordance with the present invention. The histogram shows a time interval T on the horizontal axis and a number of echoes X on the vertical axis. The number X is incremented as each echo is detected at the appropriate time when the echo is detected over the time interval T.

In FIG. 3a, the histogram shows that 5 echoes have been detected at a time T1, 10 echoes have been detected at a time T2, and 2 echoes have been detected at a time T3 over the course of a regular time interval T during which the incoming line to the local telephone is sampled relative to the transmission of each reference signal. The histogram compares the number and timing of each echo detected with the number and timing of the echoes recorded in an initial echo profile. If a significant number of echoes are detected at any point in time which differs from the information in the initial echo profile, the system alerts that a possible third connection has been made on the line, thereby indicating the detection of a three way calling event.

Figure 3B:
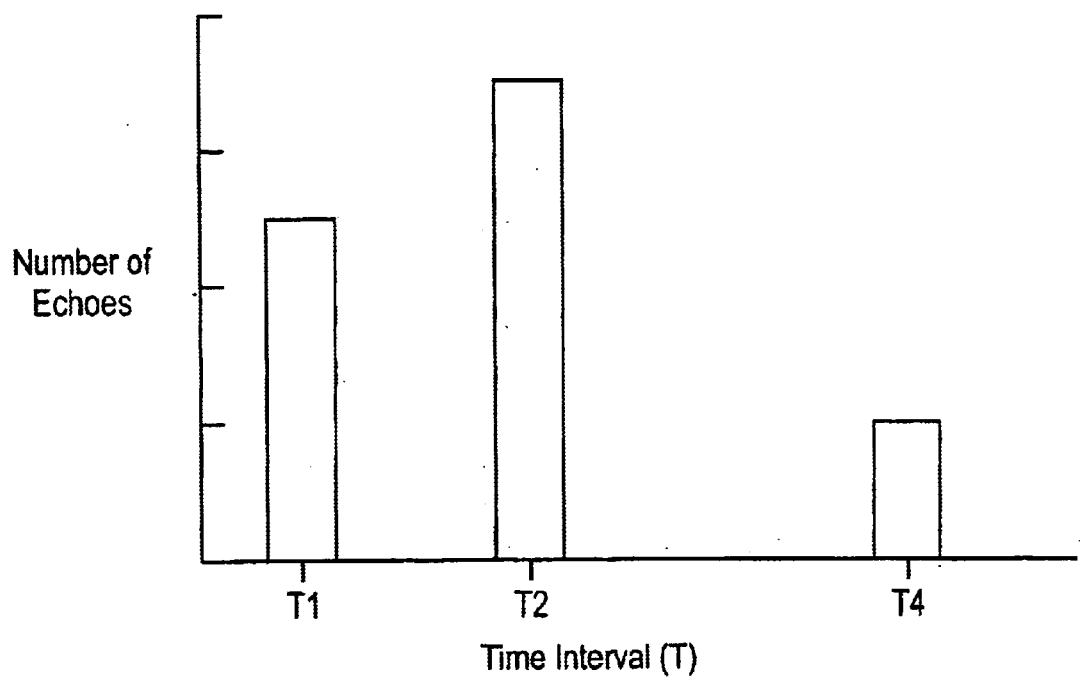

For example, FIG. 3b shows a sample initial echo profile which indicates that echoes Ech1, Ech2, and Ech3 were detected at times T1, T2 and T4 when the initial echo profile was created. Comparing the histogram of FIG. 3a with the initial echo profile in FIG. 3b, the histogram shows that over the duration of the time interval T, 5 echoes have subsequently been detected at time T1, relative to each transmission of the reference signal. Thus, given the fact that 5 have been detected all at the same relative point in time, we can be pretty sure these are definitely echoed versions of the reference signal and not some type of anomaly. Further, given the fact that these echoes have all occurred at the point in time T1, which corresponds with the same point in time T1 where the echoes Ech1 were recorded in the initial echo profile, we can be pretty sure that at least in so far as these echoes are concerned there has been no change in the echo characteristics of the line up to the point where these echoes occurred.

Likewise, referring again to FIG. 3b, the histogram shows that 10 echoes have subsequently been detected at time T2, relative to the transmission of the reference signal over the duration of the time interval T. Given the fact that 10 echoes have been detected we can be pretty sure these echoes are definitely echoed versions of the reference signal and not some type of anomaly. Further, given the fact that these echoes have all occurred at the point in time T2, which corresponds with the same point in time T2 where the echoes Ech2 were recorded in the initial echo profile, we can be pretty sure that at least in so far as these echoes are concerned there has been no change in the echo characteristics of the line up to the point where these echoes occurred.

However, referring to FIG. 3a, the histogram shows that 2 echoes have been detected at a time T3, while the initial echo profile as shown in FIG. 3b shows echoes Ech3 were originally detected at time T4. Since only 2 echoes have been detected at this time T3, this may be an anomaly; however, if the system detects several more echoes, above some threshold number, with each of these echoes occurring at the time T3, instead of the time T4 as indicated by the initial echo profile, a three way calling event may have occurred, altering the echo characteristics of the line and the present invention generates a signal alerting an operator to this fact.

Accordingly, referring once again to FIG. 2, if remote telephone 216 attempts to add the third party telephone 250 into an existing phone conversation, the voice signals from local telephone 212 (including the reference signal) are now also routed through dual hybrid circuit 242 to the $3^{rd}$ party telephone 250. Additional echoes will result as the reference signal is reflected at the impedance mismatch of the dual hybrid circuit 242. Moreover, the additional time required to route the reference signal through the central office 210 to the third party telephone 250 and back, significantly increases the echo delay time associated with these additional echoes, thereby ensuring the likelihood that they will not overlap with any of the other echoes previously detected and recorded in the initial echo profile. Accordingly, these additional echoes will be detected at a different point in time from those echoes which were originally detected in the initial profile. If these additional echoes are detected several times as the process continues and the histogram shows a significant change in the echo profile over time, i.e. if the number of echoes detected at this point in time exceeds a threshold value, the system triggers the detection of a three way calling event and alerts an operator.

Figure 4:
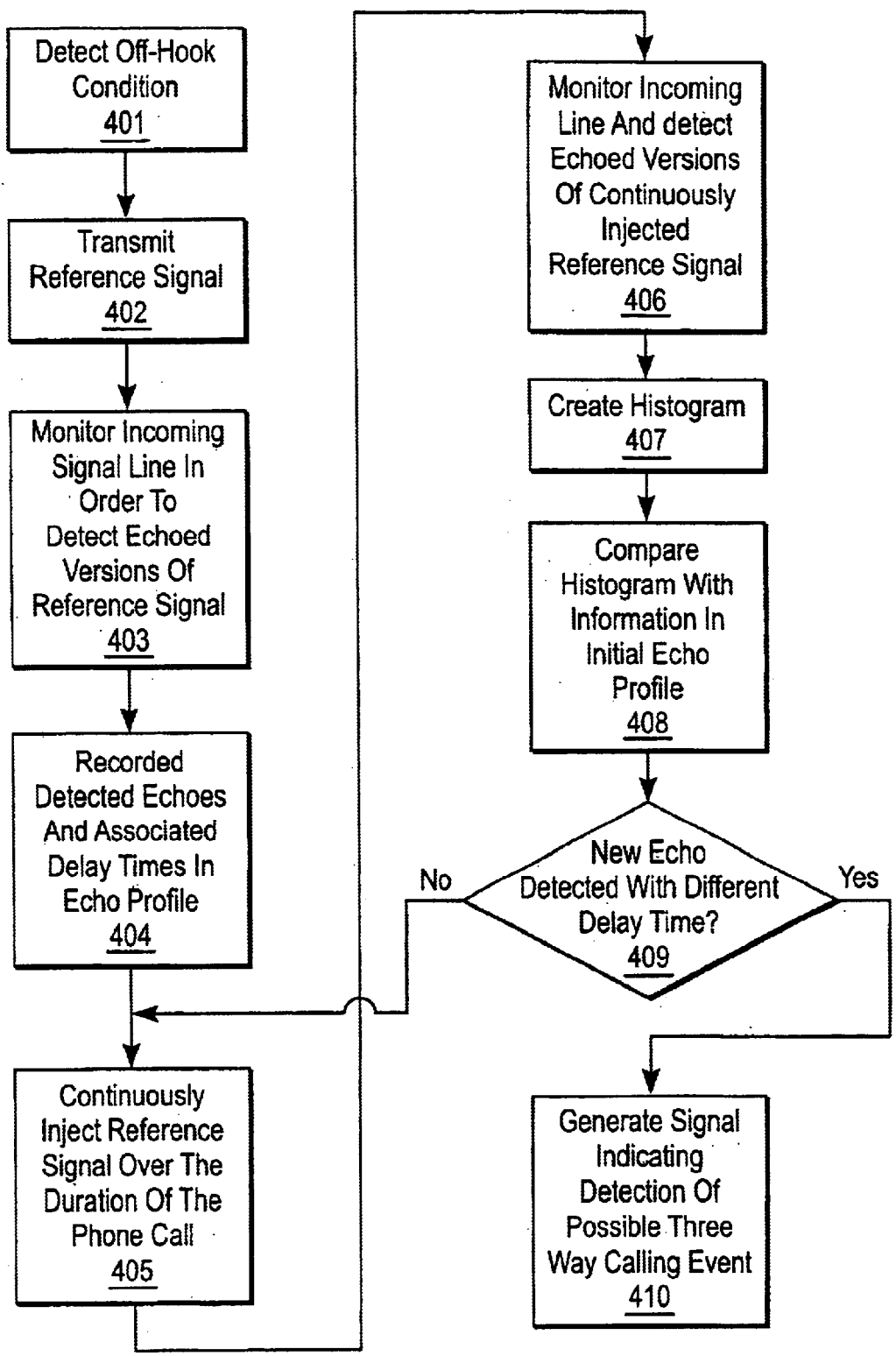
FIG. 4 is a flowchart illustrating the steps in a process for detecting a three way calling event in accordance with a preferred embodiment of the present invention.

FIG. 4 illustrates a flowchart showing the steps in a process for detecting three way calling events in accordance with the present invention. As shown, the first step 401 in the process is to detect an off hook condition signaling that a two way connection has been made whenever a call is made from the local telephone 212. Once an off-hook condition has been established, the next step in the process 402 is to transmit a reference signal on the outgoing signal line from the local telephone. The third step 403 in the process is to monitor the incoming signal line at the local telephone in order to detect echoed versions of the reference signal. As each echo is detected, its associated echo delay time is measured. In a fourth step 404, the number of echoes detected and each of their associated delay times are then recorded in an initial echo profile. Over the duration of the telephone call, the reference signal is continuously injected into the voice signals transmitted from the local telephone over the outgoing line (step 405). The incoming line is monitored and echoed versions of the reference signal are detected (step 406). A histogram is created in a memory showing each detected echo and the associated echo delay time (step 407). The histogram is continuously compared with information in the initial echo profile (step 408). If the histogram shows that an echo has been continuously detected for a number of times exceeding a predetermined threshold and the delay time associated with that echo does not correlate with any of the echoes detected and recorded in the initial echo profile (step 409), a signal is generated indicating the possible occurrence of a three way calling event (step 410).

Figure 5:
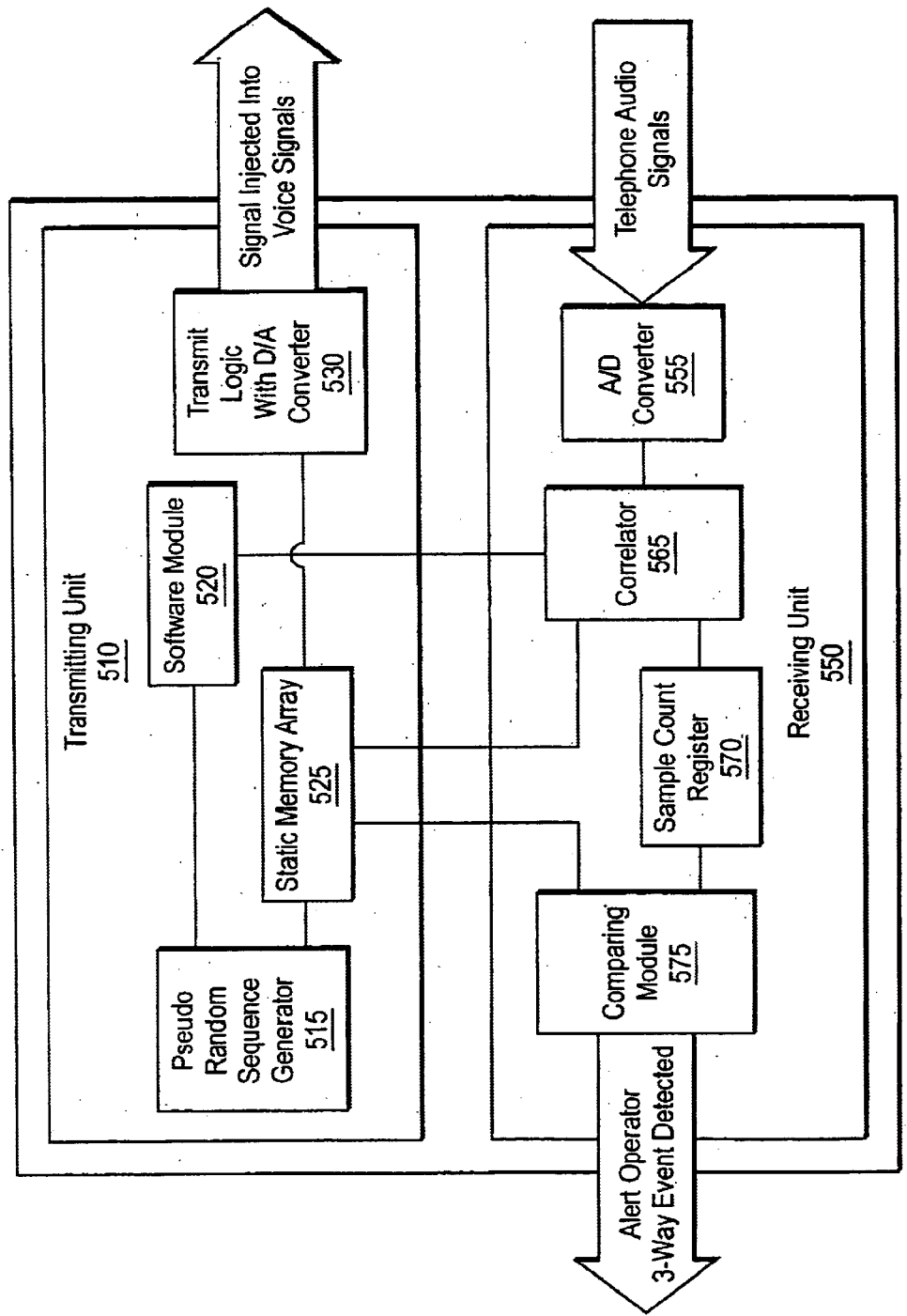
FIG. 5 is a block diagram of the internal components of a three way call detection system designed in accordance with the present invention.

FIG. 5 illustrates a functional block diagram showing the internal components of one preferred embodiment of a three way call detection system 201 of the present invention. As shown, the three way call detection system includes a transmitting unit 510 having a pseudo random sequence generator 515, a software module 520, a static memory array 525 and a transmit logic module with D/A converter 530. The three way call detection system further includes a receiving unit 550 coupled to the transmitting unit and having an A/D converter 555, a correlator 565, a sample count register 570 and a comparing module 575. The operations of the transmitting unit 510 and the receiving unit 550 shall now be described in further detail.

Transmitting Unit

In operation, the software module 520 in the transmitting unit 510 instructs the pseudo random sequence generator 515 to generate a pseudo random sequence which operates as a reference signal. This pseudo random sequence will preferably be between 32 and 256 bits in length, although it is understood that the pseudo random sequence may be longer or shorter as required by the system (with longer sequences requiring more time to detect their echo but ensuring more accurate detection of an echo). Each bit in the pseudo random sequence is preferable represented as a logic high (+1) or a logic low (−1). The reference signal is stored in the static memory array 525 for future reference. The software module 520 also sets the transmit logic module with D/A converter 530 to a preselected transmit audio level. The software module 520 then places the transmitting unit 510 into an idle state. In this state, the transmitting unit 510 is ready and waiting to inject the pseudo random noise sequence into the normal telephone conversation audio streams from the local telephone 212 for transmission to the remote telephone 216.

Using conventional techniques known in the art, the system detects a pick up at the other end of the line at the remote telephone 216. The software module 520 then places the transmitting unit 510 into a transmit mode such that a copy of the reference signal which is stored in the static memory array 525 is transferred to the transmit logic module with D/A converter 530 where it is converted into a spread spectrum analog signal having the pre-selected audio level, thereby creating a spread spectrum analog signal output. This spread spectrum analog signal output is then injected into and summed with the telephonic voice signals transmitted from the local telephone 212 to the remote telephone 216. Preferably, the signal is muted at the local telephone 212 so the near end user cannot detect the injection of the spread spectrum signal.

After the reference signal has been injected into the voice signals transmitted from the local telephone 212, the software module 520 then places the transmitting unit 510 into a hold state. When in the hold state, the transmitting unit 510 waits until the next reference signal is to be transmitted. The transmitting unit 510 remains in this state until the receiving unit 550 signals that the maximum number of samples, as described further hereinafter, has been reached; in which case the entire process is then repeated at regular intervals over the duration of the telephone call.

While the transmitting unit 510 is in a hold state, the receiving unit 550 will monitor the incoming signals to detect any echoed versions of the reference signal. An initial echo profile will be recorded which includes the number and timing of each detected echo. This profile will also be stored in the static memory array 525. This initial echo profile contains echo characteristics of the two way connection between the local telephone 212 and remote telephone 216.

Then, as explained earlier, this process of transmitting the reference signal into the audio stream from local telephone 212 is repeated by the transmitting unit 510 intermittently over the duration of the telephone call.

Receiving Unit

As shown in FIG. 5, the receiving unit 510 is coupled to the transmitting unit 550. The receiving unit 550 monitors the status of the transmitting unit 510 in order to determine when to begin sampling for the returned echoed versions of the pseudo random sequence. Whenever the transmitting unit 510 is in the transmit state or the hold state, the receiving unit 550 is actively sampling the incoming line to local telephone 212 in order to detect any echoed versions of the pseudo random sequence.

In operation, the A/D converter 555 of the receiving unit converts the incoming telephone audio signals into digital signals having logic high bits (+1) and logic low bits (−1). The A/D converter 555 then passes the converted digital signals into the correlator 565. The correlator 565 acts as a matched filter in order to detect the echoed version of the transmitted pseudo random noise signal. The correlator 565 is similar to a FIFO register where data is fed in through a first end and out a second end. The correlator reads the information stored in the static memory array (i.e. the original reference signal which was transmitted) and performs a bit by bit comparison between the reference signal with the incoming data as it is passed through the correlator in order to accurately detect the presence of an echoed version of the pseudo random sequence.

The sample count register 570 keeps track of the number of samples taken and the time each sample is taken. Each time the correlator 565 detects an echoed version of the pseudo random sequence, the sample count and time is recorded and stored in a histogram which is generated by the sample count register 570. Echoed versions are continuously sampled and recorded in the histogram showing the number of echoes detected and echo or delay time of each detected echo.

The contents of the histogram are then compared with the contents of the echo profile by the comparing module 575 after each sampling period, in order to determine whether a three way calling event has occurred. Under normal conditions, the sample count and time recorded for each of the detected echoed versions of reference signal should remain constant and should match the information stored in the initial profile. However, if a three way calling event occurs, the sample count and timing for detected echoes versions will change significantly from the information stored in the initial profile (i.e., echoes will be detected at different delay times) and the comparing module 575 will detect this difference and alert an operator that a three way calling event has been detected.

Figure 6:
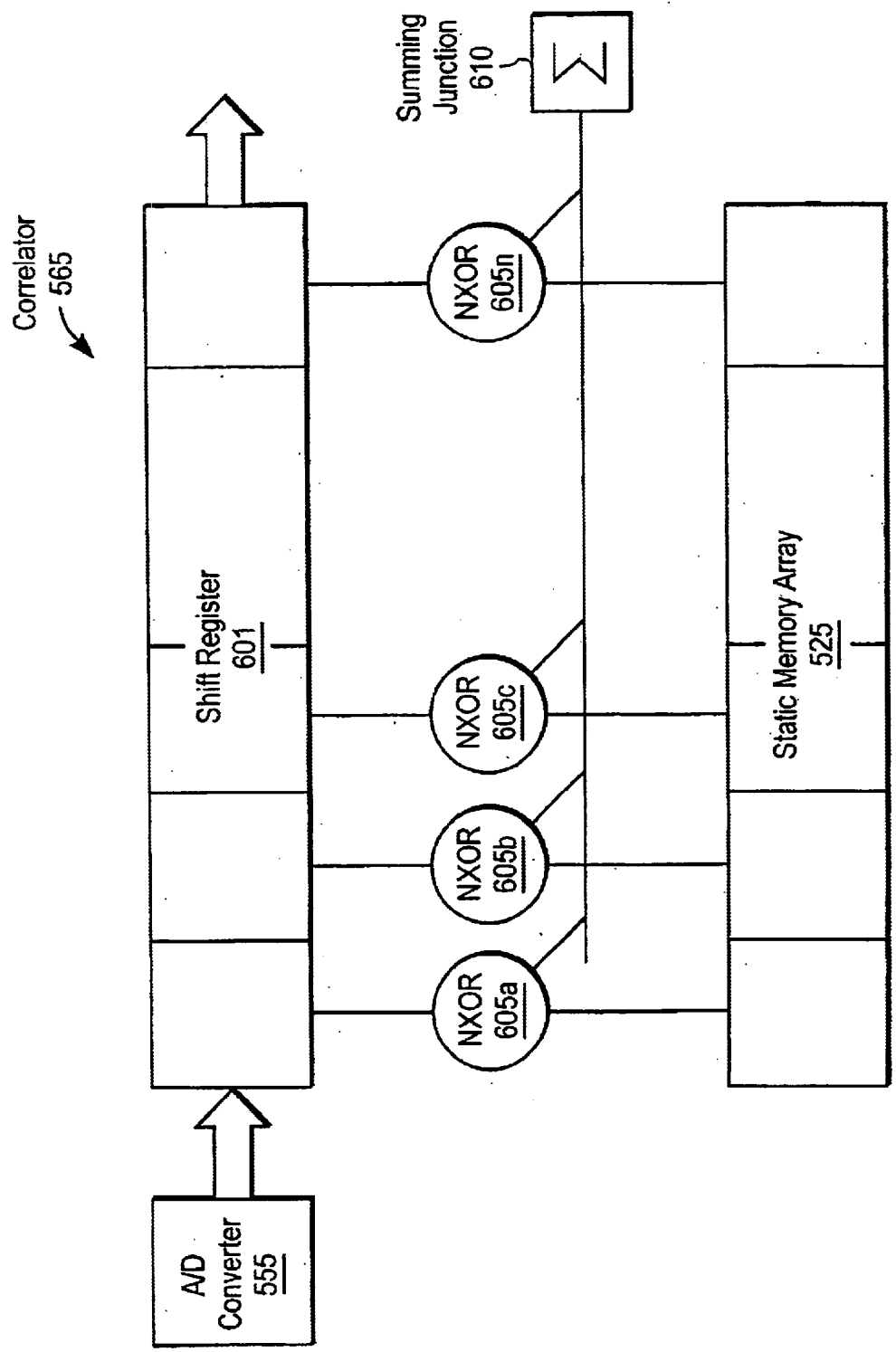
FIG. 6 illustrates an auto correlator used to detect echoed versions of a pseudo random sequence in a preferred embodiment of the present invention.

FIG. 6 shows a functional block diagram of a preferred embodiment of a special correlator 565 which is used in the three way call detection system of the present invention when the reference signal is a spread spectrum PN sequence. As shown in FIG. 6, the converted incoming digital data is fed through a receive FIFO shift register 601 which is equal in length to the number of bits in the pseudo random sequence—i.e. this shift register 601 is capable of holding the same number of bits positions as that in the pseudo random sequence. The receive shift register 601 excepts the latest incoming digital data at one end from the A/D converter 555 and shifts the digital data out from the other end. In this way the digital data continues to flow through the register 601 during the sampling period and register acts as sort of window through which the incoming digital data is passed and can be measured at any time. The receive shift register 601 may also be implemented as a circular buffer with the oldest data being written over with the newest data and a circular rotating pointer used instead of actually shifting the information through a register.

As the digital data is shifted through the receive shift register 601 it is compared with the reference signal stored in the static memory array 525 on a bit by bit basis such that each bit in the reference signal is compared with a corresponding bit in the same position in the shift register 601 using an inverted exclusive—or array (NXOR) 605a–605n. The output from each element in the NXOR array 605a–605n is summed with the other outputs at a summing junction 610. Because the reference signal is a pseudo random noise sequence, any sequence of digital data which passes through the shift register 601 other than the reference signal has the tendency to sum to a low value and therefore, the output of the correlator 565 should remain very low. However, when the digital data which passes through the shift register 601 matches the reference signal, each sample adds to the filter such that a high level output occurs at the summing junction 610. When the output from the summing junction falls above a predetermined threshold, an echoed version is said to have been detected and the point in time where it has been detected is recorded in the histogram by the sample count register 570. By using a long pseudo random sequence, many small contributions from each of the samples results in a large correlation, even in the presence of overwhelming signal interference.

As explained earlier, the results output from the correlator 565 are constantly stored in a histogram in the sample count register 570 along with the sampling time or count where those echoes occurred. At the end of each sampling interval, i.e. after all samples have been collected but before the next reference signal is generated and transmitted, the results stored in the histogram in the sample count register 570 are compared with the initial echo profile. The sampling times or counts where the correlator 565 output was the highest, i.e. the points in time where echoed versions of the reference signal were detected, should remain the same within a given tolerance and given repetition factor when compared with the contents of the initial profile. Accordingly, consistent echoes should be detected with the time between each detection being fairly constant. These echoes should match with the results of the information stored in the initial echo profile—i.e. the number of echoes detected and the timing delay associated with each echo should correlate with the initial echoes detected and stored in the initial profile.

However, if the sampling times or counts where the output from the correlator 565 is highest do not match with the information stored in the initial echo profile—i.e if multiple echoes are detected at different periods of time (i.e. one echo from the remote telephone 216 and another echo from the third party telephone 250) then this is tracked by the histogram. If this difference continues to occur over a period of time, i.e. if a number of echoes above a threshold value continue to be detected at a point in time different from those recorded in the initial profile, then a three way calling event has been detected.

If the comparing module 575 detects multiple echoes having different echo delay times, the comparing module 575 will preferably send an alarm signal to an operator alerting the operator that a three way calling event has been detected. This alarm signal may be an audio alarm signal or a visual alarm signal such a lighted LED indicating the detection of a three way calling event.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for detecting a three way calling event during a telephone call, the method comprising:

detecting an initial set of echo characteristics using a spread spectrum reference signal, the echo characteristics for a telephone connection over which the telephone call is made, and storing the initial set of echo characteristics in an initial echo profile;

continuously measuring the echo characteristics using the spread spectrum reference signal of the telephone connection at various times during the telephone call; and comparing the continuously measured echo characteristics with the initial set of echo characteristics stored in the initial echo profile in order to detect a three way calling event.

2. The method of claim 1 further comprising:

reporting a three way call event if the continuously measured echo characteristics are determined to be significantly different from the initial set of echo characteristics stored in the initial echo profile as a result of the comparing step.

3. The method of claim 1, wherein detecting an initial set of echo characteristics further comprises:

transmitting the reference signal over the telephone connection when the telephone call first begins; and detecting echoed versions of the reference signal and recording a delay time associated with each echoed version of the reference signal, thereby generating an initial echo profile describing each echoed version of the reference signal and its associated delay time.

4. The method of claim 3, wherein continuously measuring the echo characteristics of the telephone connection at various times further comprises:

successively re-transmitting the reference signal at preselected intervals throughout the duration of the telephone call; and detecting echoed versions of the reference signal after each successive transmission and recording a subsequent delay time associated with each of the detected echoes.

5. The method of claim 4, wherein comparing the measured echo characteristics with those stored in the initial echo profile in order to detect a three way calling event further comprises:

comparing the subsequent delay times associated with each of the detected echoes of the reference signal with the delay times recorded in the initial echo profile in order to determine whether any of the echoed versions of the reference signal occur at subsequent delay times which differ from the initial delay times recorded in the initial echo profile.

6. The method of claim 1 wherein the reference signal is a spread spectrum pseudo-random noise signal.

7. The method of claim 1 wherein echoed versions of the reference signal are detected using auto-correlation techniques in order to accurately detect faint echoed versions of the reference signal.

8. A method for detecting three way calling event comprising:
   transmitting a first analog spread spectrum signal over a telephone line from a local telephone;
   detecting echoed versions of the first analog spread spectrum signal;
   generating a first echo profile which records a delay time associated with each detected echoed version of the first analog spread spectrum signal;
   transmitting a second analog spread spectrum signal over the telephone line from the local telephone;
   detecting echoed versions of the second analog spread spectrum signal;
   generating a second echo profile which records a delay time associated with each detected echoed version of the second analog spread spectrum signal; and
   comparing the first echo profile with the second echo profile in order to determine whether a three way calling even has occurred.

9. The method of claim 8, further comprising generating a signal indicating that a three way calling event has occurred if the second echo profile is substantially different from the first echo profile.

10. The method of claim 8, further comprising:
    generating a first digital pseudo random noise sequence;
    converting the first digital pseudo random noise sequence into the first analog spread spectrum signal before transmitting the first analog spread spectrum signal over the telephone line from the local telephone.

11. The method of claim 8, further comprising:
    generating a second digital pseudo random noise sequence;
    converting the second digital pseudo random noise sequence into the second analog spread spectrum signal before transmitting the second analog spread spectrum signal over the telephone line from the local telephone.

12. A system for detecting three way call events on a telephone line, comprising:
    a transmitting module for transmitting a plurality of spread spectrum reference signals over a telephone connection during a telephone call in order to determine echo characteristics of the telephone connection; and
    a receiving module for continuously receiving echoed versions of the plurality of spread spectrum reference signals in order to monitor the echo characteristics of the telephone connection over the duration of the telephone call, wherein the receiving module detects a three way call event if the echo characteristics of the telephone connection change over the duration of the telephone call.

13. The system of claim 12, wherein the receiving module:
    records a plurality of time delays associated with each echoed version of an initial reference signal in the plurality of reference signals and records the plurality of time delays in an initial echo profile;
    measures echo times associated with echoed versions of each of the other reference signals in the plurality of reference signals; and
    compares the plurality of time delays in the initial echo profile with the measured echo times associated with the echoed versions of each of the other reference signals in the plurality of reference signals in order to determine whether a three way calling even has occurred.

14. The system of claim 13 wherein the receiving module comprises:
    an auto correlator for receiving the echoed versions of the plurality of reference signals;
    a sample count register for recording the plurality of time delays associated with each echoed version of the initial reference signal in an initial echo profile and measuring echo times associated with echoed versions of each of the other reference signals in the plurality of reference signals; and
    a comparing module for comparing the plurality of time delays in the initial echo profile with the measured echo times associated with the echoed versions of each of the other reference signals in the plurality of reference signals in order to determine whether a three way callings even has occurred.

15. The system of claim 12, wherein the receiving module generates an alarm signal indicating that a three way calling event has occurred if the plurality of time delays in the initial echo profile do not correlate with the measured echo times associated with the echoed versions of each of the other reference signals.

16. The system of claim 12, wherein the transmitting module comprises:
    a pseudo random sequence generator for generating pseudo random sequences; and
    a transmit logic with a digital-to-analog converter for converting the pseudo random sequences into the plurality of reference signals which are transmitted over the telephone connection during the telephone call in order to determine echo characteristics of the telephone connection.

17. A system for detecting three way call events on a telephone line, comprising:
    a digital signal processor; and
    a memory, coupled to the digital signal processor, for storing a sequence of instructions which, when executed by the digital signal processor, cause the digital signal processor to perform the steps of:
    successively transmitting a spread spectrum reference signal over the telephone line;
    detecting echoed versions of each of the successively transmitted reference signals;
    measuring an echo time delay associated with each of the detected echoed versions of each successively transmitted reference signal; and
    reporting a three way call event if the echo time delay for the detected echoed versions of each successively transmitted reference signal does not remain consistent.

18. The system of claim 17, wherein the reference signal is a digital pseudo-random noise sequence.

19. The system of claim 18, wherein the digital pseudo-random signal is converted into a spread spectrum analog signal before each transmission.

20. The system of claim 18, further comprising an auto correlator for detecting the echoed versions of each of the successively transmitted digital pseudo-random noise sequence.

21. A computer program product comprising:
a computer useable medium having computer readable code embodied therein for detecting a three way calling event, the computer readable code causing a computer to:
- detect an initial set of echo characteristics using a spread spectrum reference signal, the echo characteristics for a telephone connection over which a telephone call is made, and store this initial set of echo characteristics in an initial echo profile;
- continuously measure the echo characteristics using the spread spectrum reference signal of the telephone connection at various times throughout the duration of the telephone call; and
- compare the measured echo characteristics with those stored in the initial echo profile in order to detect a three way calling event.

22. A method for detecting a three way calling event during a telephone call, the method comprising:
- detecting an initial set of echo characteristics using a FM Chirp reference signal, the echo characteristics for a telephone connection over which the telephone call is made, and storing the initial set of echo characteristics in an initial echo profile;
- continuously measuring the echo characteristics using the FM Chirp reference signal of the telephone connection at various times during the telephone call; and
- comparing the continuously measured echo characteristics with the initial set of echo characteristics stored in the initial echo profile in order to detect a three way calling event.

23. The method of claim 22 further comprising:
reporting a three way call event if the continuously measured echo characteristics are determined to be significantly different from the initial set of echo characteristics stored in the initial echo profile as a result of the comparing step.

24. The method of claim 22, wherein detecting an initial set of echo characteristics further comprises:
- transmitting the reference signal over the telephone connection when the telephone call first begins; and
- detecting echoed versions of the reference signal and recording a delay time associated with each echoed version of the reference sign, thereby generating an initial echo profile describing each echoed version of the reference signal and its associated delay time.

25. The method of claim 22, wherein continuously measuring the echo characteristics of the telephone connection at various times further comprises:
- successively re-transmitting the reference signal at preselected intervals throughout the duration of the telephone call; and
- detecting echoed versions of the reference signal after each successive transmission and recording a subsequent delay time associated with each of the detected echoes.

26. The method of claim 25, wherein comparing the measured echo characteristics with those stored in the initial echo profile in order to detect a three way calling event further comprises:
- comparing the subsequent delay times associated with each of the detected echoes of the reference signal with the delay times recorded in the initial echo profile in order to determine whether any of the echoed versions of the reference signal occur at subsequent delay times which differ from the initial delay times recorded in the initial echo profile.

27. The method of claim 22, wherein echoed versions of the initial reference signal are detected using a matched FIR filter with an infinite impulse response.

* * * * *

UNITED STATES PATENT AND TRADEMARK OFFICE
CERTIFICATE OF CORRECTION

PATENT NO.    : 6,763,099 B1
DATED         : July 13, 2004
INVENTOR(S)   : Russell Blink It is certified that error appears in the above-identified patent and that said Letters Patent is hereby corrected as shown below:

Column 16,
Line 25, "callings" should be -- calling --.

Column 18,
Line 7, "sign" should be -- signal --.

Signed and Sealed this

Fifth Day of October, 2004

JON W. DUDAS
*Director of the United States Patent and Trademark Office*